United States Patent
Heflinger et al.

(10) Patent No.: US 6,441,938 B1
(45) Date of Patent: Aug. 27, 2002

(54) OPTICAL COMMUNICATION SYSTEM WITH A SINGLE POLARIZED, PHASE MODULATED TRANSMITTED BEAM

(75) Inventors: Donald G. Heflinger; Lee O. Heflinger, both of Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/283,053

(22) Filed: Apr. 1, 1999

(51) Int. Cl.[7] ............................................. H04B 10/00
(52) U.S. Cl. ..................... 359/156; 359/173; 359/183; 359/191; 359/192
(58) Field of Search ............................. 359/156, 173, 359/181, 182, 183, 191, 192, 122

(56) References Cited

U.S. PATENT DOCUMENTS

| | | | |
|---|---|---|---|
| 3,600,587 A | * 8/1971 | Smith | 250/199 |
| 3,699,463 A | * 10/1972 | Stone | 329/145 |
| 3,752,992 A | * 8/1973 | Fluhr | 250/199 |
| 4,769,853 A | * 9/1988 | Goodwin et al. | 455/616 |
| 5,424,863 A | * 6/1995 | Gertel | 359/173 |
| 6,147,755 A | * 11/2000 | Heflinger et al. | 356/349 |
| 6,243,168 B1 | * 6/2001 | Heflinger et al. | 356/486 |
| 6,278,170 B1 | * 8/2001 | Komatsu | 257/458 |

* cited by examiner

Primary Examiner—Leslie Pascal
Assistant Examiner—Hanh Phan
(74) Attorney, Agent, or Firm—Robert W. Keller

(57) ABSTRACT

An optical communication system, using a radio frequency (RF) signal for communicating an analog communication signal, includes an optical transmitter and an optical receiver. The optical transmitter generates a reference light beam, generates a phase modulated communication light beam by phase modulating the reference light beam with the analog communication signal, polarizes a portion of the reference light beam and combines the polarized reference light beam and the phase modulated communication light beam. The optical receiver separates the reference light beam and the communication light beam, develops a shifted light beam that is shifted in frequency by the RF frequency, interferometrically combines the communication light beam with the shifted light beam to provide a heterodyne signal including information regarding the state of phase of the communication light beam, uses the heterodyne signal to produce an electrical signal at an optical beat frequency corresponding to the RF and with a phase corresponding to the state of phase of the communication light beam, and derives from the RF signal and the heterodyne signal an output signal that has a linear correspondence to the state of optical phase of the communication light beam and the analog communication signal.

45 Claims, 3 Drawing Sheets

OPTICAL COMMUNICATION SYSTEM WITH A SINGLE POLARIZED, PHASE MODULATED TRANSMITTED BEAM

BACKGROUND OF THE INVENTION

1. Field of the Invention

The present invention is generally related to optical communication systems, and more particularly to an optical communication system utilizing a single polarized, phase modulated transmitted beam that provides substantially linear recovery of an analog communication signal.

2. Description of the Prior Art

Analog optical communication links are known in the prior art. Conventional optical analog links employ intensity modulation techniques to convey the analog information on an optical beam of light. Such analog optical links are utilized by the cable television industry to transmit video images using the conventional RF analog modulation format for television video. Intensity detection at the receiver using conventional photodetectors enables the light intensity to be linearly converted to an analog voltage corresponding to the signal that is to be transmitted by the link. However, inherent to these analog intensity modulation optical links is an acceptance of a non linearity associated with the intensity modulators used in the transmitter. Mach-Zehnder intensity modulators, which are commonly employed in optical intensity modulation analog links, have a non linear transfer function that yields a sinusoidal intensity variation with a linearly changing applied analog modulation voltage. Similarly, electro absorption modulators also yield a non linear intensity variation to a linearly applied analog modulation voltage.

This inherent non linearity associated with intensity modulators has led to a consideration of using optical phase modulation in the transmitter as an alternative to intensity modulation. Optical phase modulators that can achieve a linear change in the state of the optical phase with a linearly changing analog modulation voltage are known in the art. Modulators can be made from electro optic materials that change their refractive index linearly with applied electric field supplied by a linearly changing analog modulation voltage. The linearly changing refractive index causes the optical path length through the modulator to linearly change. This linearly changing optical path length causes a linearly changing state of optical phase corresponding with a linearly changing analog modulation voltage. Thus, an optical phase modulator can be used in the transmitter to deliver a linearly varying optical signal in contrast to the inherent non linearity associated with intensity modulators.

The utilization of a linear phase modulator in an analog optical communication link requires that the state of optical phase be detected at the receiver. Conventional approaches for this utilize optical interference techniques that cause the phase varying light to become detectable with photodetectors as intensity variations. A common approach used for optical phase state detection is to interfere the phase modulated communication light with an unmodulated reference beam of light that has been split from the initial light source prior to applying the phase modulation. The process of utilizing optical interference techniques to detect the state of optical phase leads to a non linear sinusoidal intensity variation that corresponds to the linearly varying state of optical phase. Thus, this conventional phase detection process leads to a non linearity in the detected analog signal. This non linearity inherent in the conventional phase detection process negates the linearity achieved by the phase modulator and results in an analog optical communication link that is as non linear as the conventional intensity modulation analog optical link. Thus, all analog optical communication links are degraded in performance by an inherent non linearity that distorts the original analog signal that is to be conveyed.

What is needed, therefore, is an analog optical communications system that is capable of detecting the state of opticalphase of a phase modulated communication signal in a way so as to produce an analog voltage signal that is linearly related to the state of optical phase of the phase modulated optical signal. Such an analog optical communications system thus will be capable of conveying an analog signal without any non linear distortion.

SUMMARY OF THE INVENTION

The preceding and other shortcomings of the prior art are addressed and overcome by the present invention which provides generally an optical communication system for communicating an analog communication signal.

Briefly, the optical communication system comprises an optical transmitter and an optical receiver separated by an analog optical link. The transmitter comprises means for generating a polarized communication light beam that includes an orthogonally polarized reference light beam and phase modulated communication beam that is generated by means responsive to the analog communication signal.

The receiver comprises means for separating the orthogonally polarized reference light beam and the phase modulated communication light beam from the polarized communication light beam means responsive to the reference light beam and an RF signal and operative to develop a shifted light beam that is shifted in frequency by the RF frequency, means responsive to the phase modulated communication light beam and the shifted light beam and operative to interferometrically combine the communication light beam with the shifted light beam to provide a heterodyne signal including information regarding the state of phase of the communication light beam means responsive to the heterodyne signal and operative to produce an electrical signal at the optical beat frequency corresponding to the RF and with a phase corresponding to the state of phase of the communication light beam, and means responsive to the RF signal and the electrical signal and operative to Provide an output signal that has a linear correspondence to the state of optical phase said communication light beam and the analog communication signal.

More particularly, the detection of the relative phase of means for converting the RF signal into a first digital waveform, a first digital divider for dividing the first digital waveform by a predetermined integer to form a first square wave, means for converting the heterodyne signal into a second digital waveform, a second digital divider for dividing the second digital waveform by the same predetermined integer to form a second square wave, an exclusive OR circuit for processing the first and the second divided square waves to form a pulse waveform, and means for integrating the processed pulsed waveform to provide the output signal having a magnitude that varies linearly relative to the state of optical phases of the communication light beam and the analog communication signal.

Other aspects of the invention separately describe the transmitter and the receiver.

The foregoing and additional features and advantages of this invention will become apparent from the detailed description and accompanying drawing figures below. In the figures and the written description, numerals indicate the various elements of the invention, like numerals referring to like elements throughout both the drawing figures and the written description.

DETAILED DESCRIPTION OF THE PREFERRED EMBODIMENTS

Figure 1:
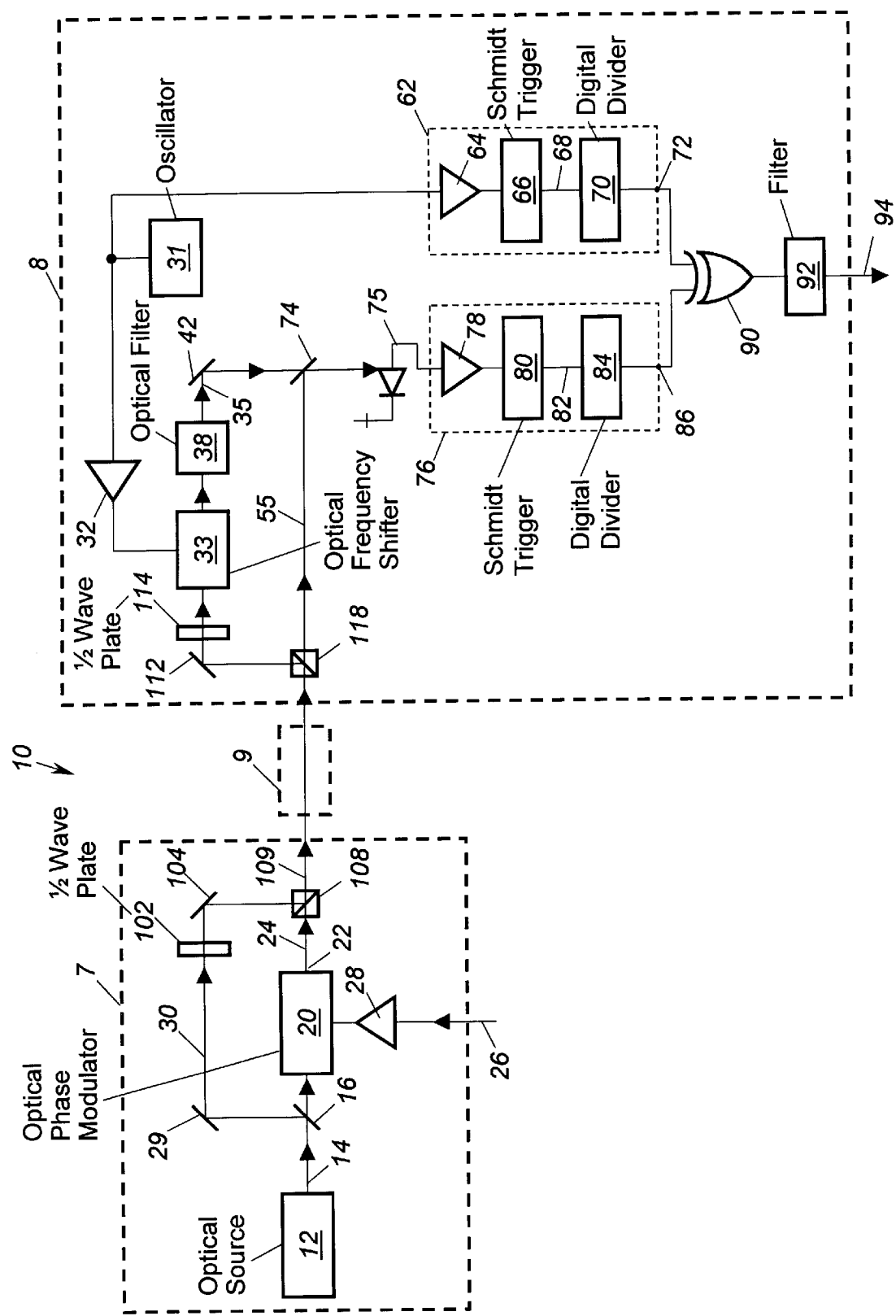
FIG. 1 is a schematic block diagram of the optical communication system in accordance with the present invention.

As illustrated in the schematic block diagram of FIG. 1, the present invention provides an optical communication system, generally designated by the numeral 10, including an optical transmitter 7 and an optical receiver 8 separated by an analog optical link 9. As will be described the optical communication system 10 transmits a single polarized phase modulated light beam and generates a voltage signal that linearly corresponds to the state of the phase of the phase modulated communication light beam, which in turn corresponds to the voltage of an analog communication signal. This state of phase is also referred to as a particular wavefront state. The particular embodiment shown in FIG. 1 uses free-space optical interconnections, however, as will be described, an all fiber optic embodiment is also possible.

In the optical transmitter 7 an optical source 12 generates a beam of coherent light at an optical frequency v and a linear electric field polarization which is applied on an optical fiber or a free-space beam 14 to a beam splitter or fiber optic coupler 16. Preferably, the optical source 12 is a semiconductor laser diode such as a distributed feedback (DFB) laser although any coherent source that delivers a linear electric field, such as a helium neon (HeNe) laser can also be used.

The beam splitter or fiber optic coupler 16 sends a portion of the optical source beam into a first input port of a straight optical phase modulator 20 having an optical output 22. An analog communication voltage signal 26, such as a signal in the radio frequency (RF) range or a video signal, is amplified by analog signal driver 28 and applied to the electrical modulation input terminal of the straight optical phase modulator 20.

The straight phase modulator 20 is a linear optical device comprising an electro-optic medium having a refractive index that depends linearly on the voltage applied across it. Thus, the refractive index of the optical medium is dynamically changed according to the applied voltage signal. When the refractive index of the optical medium is changed, the "optical path length" is changed and this causes a change in the relative optical phase of the light delivered by the straight phase modulator (relative optical phase refers to the state of the phase at the output when there is an applied voltage compared to the state of the phase at the output when there is no applied voltage). Accordingly, the straight phase modulator 20 effects the state of the optical phase of the light delivered at output 22 so as to have a linear dependence with the applied voltage. By changing the optical path length it produces a linear phase modulated communication beam 24 that corresponds linearly with the analog communication voltage signal that is applied at 26.

In this patent the phrase "optical path length" is characterized and mathematically defined as the product of the physical propagation distance and the associated refractive index of the medium through which the light propagates. It should be recognized that adjusting the optical path length can be accomplished by adjusting the physical propagation distance or adjusting the index of refraction of the medium.

The remaining portion of the optical source beam is sent by beam splitter or fiber optic coupler 16 to optical path 30 by either fiber or reflector 29 which is preferably an approximately 45° mirror and reflects the optical signal. A one-half wave plate 102 oriented at 45° degrees serves to rotate the light 30 with linear electric field polarization by 90° degrees, thereby producing orthogonally polarized light. It should be noted that this light is orthogonal relative to the original light beam 30 and also relative to the communications light beam 24, which has the same linear polarization as the light 30. This orthogonally polarized light is conveyed by fiber or by mirror 104 which directs the orthogonally polarized light onto a polarization combining cube or an integrated optic polarization beam splitter 108. The cube 108 is oriented to reflect the dorthogonally polarized light by 45° and also to transmit, without reflection, the phase modulated communication beam 24 such that the two beams are combined. The integrated optic polarization beam splitter can also combine the two beams so as to maintain the orthogonal relationship between them. This combined light is hereafter referred to as the polarized phase modulated communication light beam 109. It has two orthogonal states of polarization, one corresponding to the reference light beam and one corresponding to the phase modulated communication light beam. The light beam 109 is transmitted or launched into the analog optical link 9. This link is preferably free-space propagation or even propagation through a medium such as the atmosphere as long as the orthogonal nature of the polarization is preserved. A link made from optical fiber that does not modify the state of an arbitrary input polarization can also be used. Currently available polarization maintaining fiber, known as "Panda Fiber", includes two stress bars that are located on either side of its central core through which the light propagates. The fiber thus propagates two particular states of linear polarization without corrupting the polarization. One polarization orientation is parallel to the stress bars and the other polarization is perpendicular to the stress bars. This type of polarization maintaining fiber is not usable for this invention. A fiber that can propagate an arbitrary state of input polarization without corruption can be used.

The light beam 109 is conveyed by link 9 to the receiver 7. In the receiver the light beam 109 is applied to a polarization splitting cube or an integrated polarization beam splitter 118. The cube 118 splits the received light beam 109 into its two separate orthogonal polarization states. In particular, the cube 118 reflects the orthogonal polarized light to reflecting mirror 112 (preferably a 450 mirror) and allows the original linear polarized light to pass through it without reflection. The linear polarized light that passes through the cube 118 is hereinafter described as the phase modulated communication light beam 55 and is equivalent to the light beam 24. In a similar way, the integrated polarization beam splitter separates the two orthogonally polarized beams into separate output fibers. The orthogonally polarized light is reflected by the mirror 112 or conveyed by fiber through a one-half wave plate 114 that is oriented at 45°. The one-half wave plate 114 rotates the polarization 90°, such that it has the same polarization orientation as the phase modulated communication light beam 55. Thus, the polarized light delivered by the one-half wave plate 114 is identical to the light beam 30 in the transmitter 7.

In the preferred embodiment the free-space link 9 is in a vacuum. The integrated optic polarization beam splitters 108 and 118 are manufactured by Ramar Corporation and designated as Model 701-PB15. The one-half wave plates 102 and 114 are preferably integrated optic wave plates compatible with fiber optics manufactured by Ramar Corporation and designated as Model 251-WP15. This integrated optic wave plate is electronically tunable and can be tuned for any degree of retardation including a half-wave.

In the receiver 8 a radio frequency (RF) oscillator 31 generates an RF fixed frequency electrical signal which is applied through an amplifier or RF driver 32 to an optical frequency shifter 33. The optical frequency shifter 33 is positioned to receive the polarized reference light beam and serves to shift its optical frequency by an amount corresponding to the RF. In the preferred embodiment, the optical frequency shifter 33 is an optical modulator such as a Mach-Zehnder modulator followed by a narrow pass band optical filter to extract the shifted side band light, but it can be an acousto-optic modulator. In the case of using a Mach-Zehnder modulator as an optical frequency shifter 33, the modulator is biased at the minimum light transmission so that the delivered light will be directed into just the upper and lower side bands at an optical frequency that is shifted either up or down by the RF. By filtering this light with a narrow pass band optical filter 38, such as a Fabry Perot filter or a Bragg grating filter, it is possible to extract just the light that is either upshifted or down shifted in frequency.

In the case of an acousto-optic modulator, an acoustic sound wave is generated in an optically transparent medium by a piezoelectric transducer and the applied RF. This sound wave provides a traveling Bragg grating with a period that corresponds the RF and diffracts the incident light into an upshifted and/or down shifted light beam. The first order of diffraction is shifted in optical frequency by the RF, the second order of diffraction is shifted in optical frequency by twice the RF and so on.

The RF drive signal from oscillator 31 must be well above the highest frequency component of the analog communication signal. In the case of an acousto-optic modulator, this RF signal is limited to roughly 2 GHz. For the MachZehnder modulator this RF signal can be as high as 40 GHz. It should be recognized that any fixed RF frequency can be used as long as it is higher in frequency than the highest analog frequencies in the communication signal.

The RF drive signal from oscillator 31 is also sent to the divide chain 62. An amplifier 64 amplifies the RF drive signal to a sinusoid at a preselected amplitude that can trigger a digitizing circuit. More particularly, a Schmidt trigger 66 converts the sinusoid into a digital waveform at the RF drive signal frequency. However, other components that are functionally equivalent to a Schmidt trigger and that yield a signal that can be sent to a digital divider also can be used.

The digital waveform signal at 68 is then provided to a digital divider 70 that creates at its output 72 a square wave that is lower in frequency by the particular integer divisor used in the divide chain. Simple digital flip-flop dividers make it convenient to divide by a particular power of two. Mathematically, the square wave frequency is:

$$f/2^m, \text{ where } m=1,2,3,4\ldots,$$

and f is the RF drive signal frequency. The power of two used for the division depends on the desired resolution of the phase. It will be apparent that division by integers, denoted as N, other than powers of two also will result in similar performance provided the output of the divider chain is a square wave and that both chains 62 and 76 divide identically. Division by powers of two is the preferred embodiment because of its simplicity and ease of implementation.

The upshifted light 35 that has been frequency shifted by optical frequency shifter 33 and filtered by narrow pass band optical filter 38 is conveyed by optical fiber or mirror 42 to beam combiner 74. Beam combiner 74 can be a 50—50 beam splitter or a fiber optic coupler. Similarly, the phase modulated communication beam 55 is applied to the beam combiner 74. The beam combiner 74 interferometrically combines the beams, performs a heterodyne of the optical frequencies, and applies the results to photodetector 75. The beam combiner 74 combines the light from the frequency upshifted and the phase modulated communication beams so that the optical interference between the beams performs an optical heterodyne that generates the beat frequency representative of the RF drive signal from oscillator 31. Preferably, the optical path length of the two beams are equal. The beam combiner achieves this optical interference by making the two beams co-linear and superimposed on each other, but other techniques including fiber optic combining techniques, can be used.

The photodetector 75 responds to the intensity variations in the interference of the combined beams by optically heterodyning the two optical frequencies to create the RF beat frequency signal. This is applied to path 76 as shown in dashed lines. The particular state of phase of the detected RF beat frequency relative to the original RF driver signal from oscillator 31 corresponds directly to the particular state of phase of the phase modulated communication light beam 24. An amplifier 78 amplifies the detected RF beat frequency signal to a sinusoid at a preselected amplitude that can trigger a digitizing circuit. More particularly, a Schmidt trigger 80 converts the sinusoid into a digital waveform signal at 82 which corresponds to the RF beat frequency. However, other components that are functionally equivalent to a Schmidt trigger and yield a signal that can be sent to a digital divider also can be used.

The digital waveform signal at 82 is then provided to a digital divider 84 that creates at its output 86 a square wave that is lower in frequency by the particular integer divisor used in the divide chain. Just as was the case in divider chain 62, simple digital flip-flop dividers make it convenient to divide by a particular power of two. Mathematically, the square wave frequency is:

$$f/2^m, \text{ where } m=1,2,3,4\ldots,$$

and f is the RF drive signal frequency. The power of two used for the division must be identical to that used in divider 70. It will be apparent that division by integers, denoted as N, other than powers of two also will result in similar performance provided the output of the divider chain is a square wave and that both chains 62 and 76 divide identically.

For analog communication signal frequencies less than 1 MHz, the digital dividers 70 and 84 are FAST TTL flip-flops manufactured by Fairchild Corporation and designated as Model 74F74. For higher analog communication signal frequencies, the digital dividers 70 are made from ECL logic or digital GaAs or InP high speed integrated circuit logic which will enable analog communication signal frequencies up to 2 GHz. The two resulting square waves at 72 and 86 have an offset in their relative phase dependent on the original offset in phase that was created by the straight optical phase modulator 20.

Figure 2:
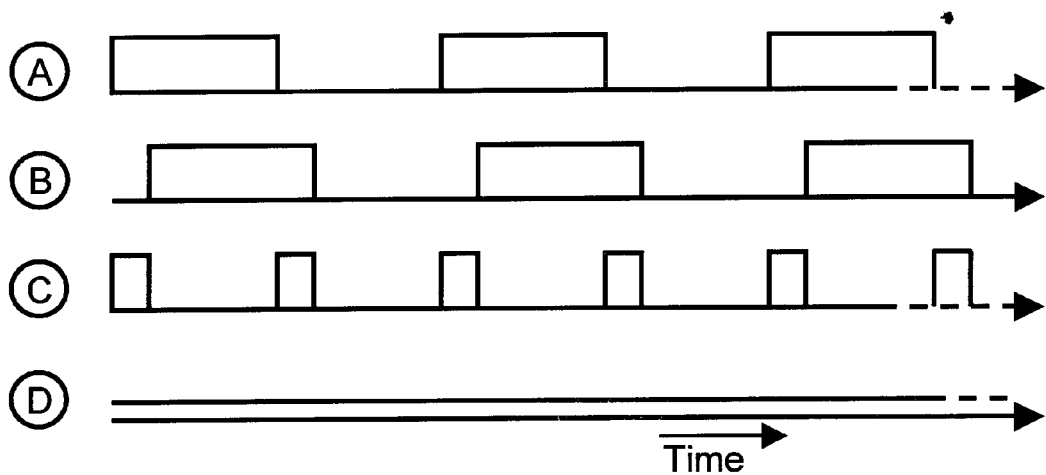
FIG. 2 is a timing diagram illustrating the waveforms developed at several elements in the receiver of the optical communication system illustrated in FIG. 1.

With reference now to FIG. 2 timing diagrams are shown for the signals appearing at the outputs 72 and 86 as they are processed through successive stages of the optical receiver. More particularly, the offset is shown by the displacement in the transitions in the timing diagram between the signal 72 at FIG. 2 A, which is the divided square wave signal derived from the RF drive signal, and the signal 86 at FIG. 2B, which is the divided square wave signal from the phase modulated communication signal beat frequency. As illustrated, one period of the square waves shown in FIGS. 2A and 2B is $2^m/f$. When these square wave signals are combined by an exclusive OR gate 90 it produces a pulse wave form shown by the signal at FIG. 2C, with a duty cycle dependent on the changed phase due to the straight optical phase modulator 20. This duty cycle is then sent through a low pass filter 92 that develops DC voltage on its output as shown in FIG. 2D, having a magnitude that is dependent on the duty cycle. Preferably, the filter 92 is a conventional resistor capacitor integrator circuit that has a time constant that is less than the time transitions in the RF analog communication voltage signal applied at 26.

Figure 3:
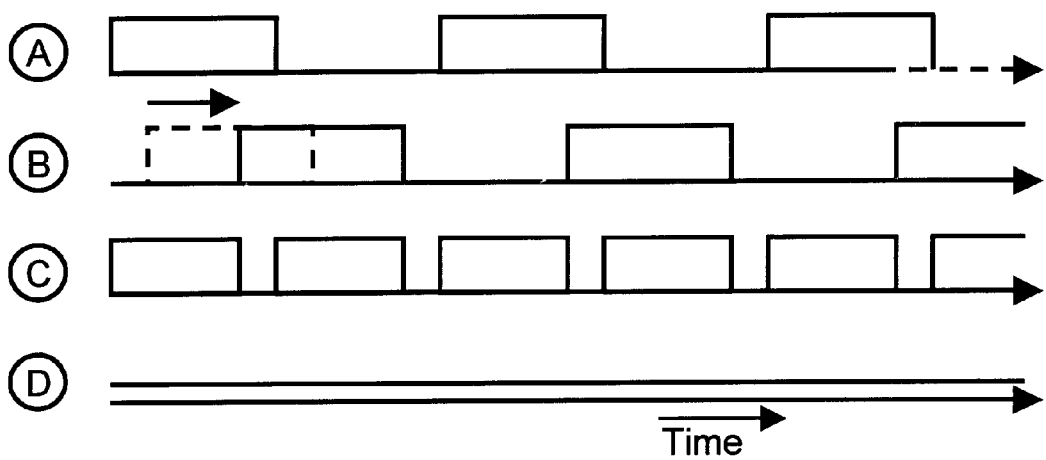
FIG. 3 is a timing diagram illustrating the waveforms developed at several elements in the receiver of the optical communication system after the state of phase of the phase modulated signal has been changed.
Figure 4:
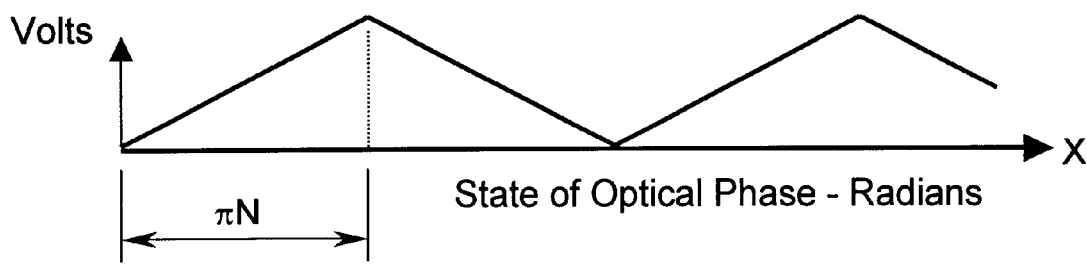
FIG. 4 is a plot of voltage versus state of optical phase representing the output signal produced by the optical receiver.

As shown in FIG. 3, new waveforms are created as a new interference pattern is developed by the optical interferometer. This results in the square wave signal at FIG. 3B being developed by the digital divider 70. As shown the signal is displaced relative to the signal at FIG. 3A (and also to the signal shown in FIG. 2B as illustrated by the dashed lines) and corresponds to the phase change. This leads to a new pulse wave form at the output of the exclusive OR gate 90 with an increased duty cycle as shown by the signal at FIG. 3C. This increased duty cycle creates a larger DC voltage at the output 94 of the low pass filter 92 as shown in FIG. 3D that has a linear dependence on the actual phase change. Plotting the voltage at the output 94 as a function of the state of optical phase in radians of the phase modulated communication beam leads to a repeating linear triangular wave form that spans several wavelengths of phase change as shown in FIG. 4. Note that in FIG. 4 the independent variable is the state of optical phase in radians (not time as shown in FIGS. 2 and 3) and that the voltage increases linearly from a minimum to a maximum when the state of optical phase is changed by $\pi N$ radians. For the special case of division by powers of two, this is equal to $\pi 2^m$ radians, where m is the integer power of two used in the divide chains. Also note that the linear triangular pattern repeats after the phase has changed by several wavelengths of optical phase. In normal use the division ratio will be chosen so that the multiple wavelengths of phase change all takes place on a single slope or segment of the response curve of FIG. 4, thus giving a linear response without passing over the peaks or valleys of the triangle wave, thereby avoiding ambiguity. Since the state of optical phase in the phase modulated communication beam has a direct linear correspondence to the analog communication voltage signal, the output voltage at 94 will have a direct linear correspondence to the analog communication voltage signal applied at input 26.

Figure 5:
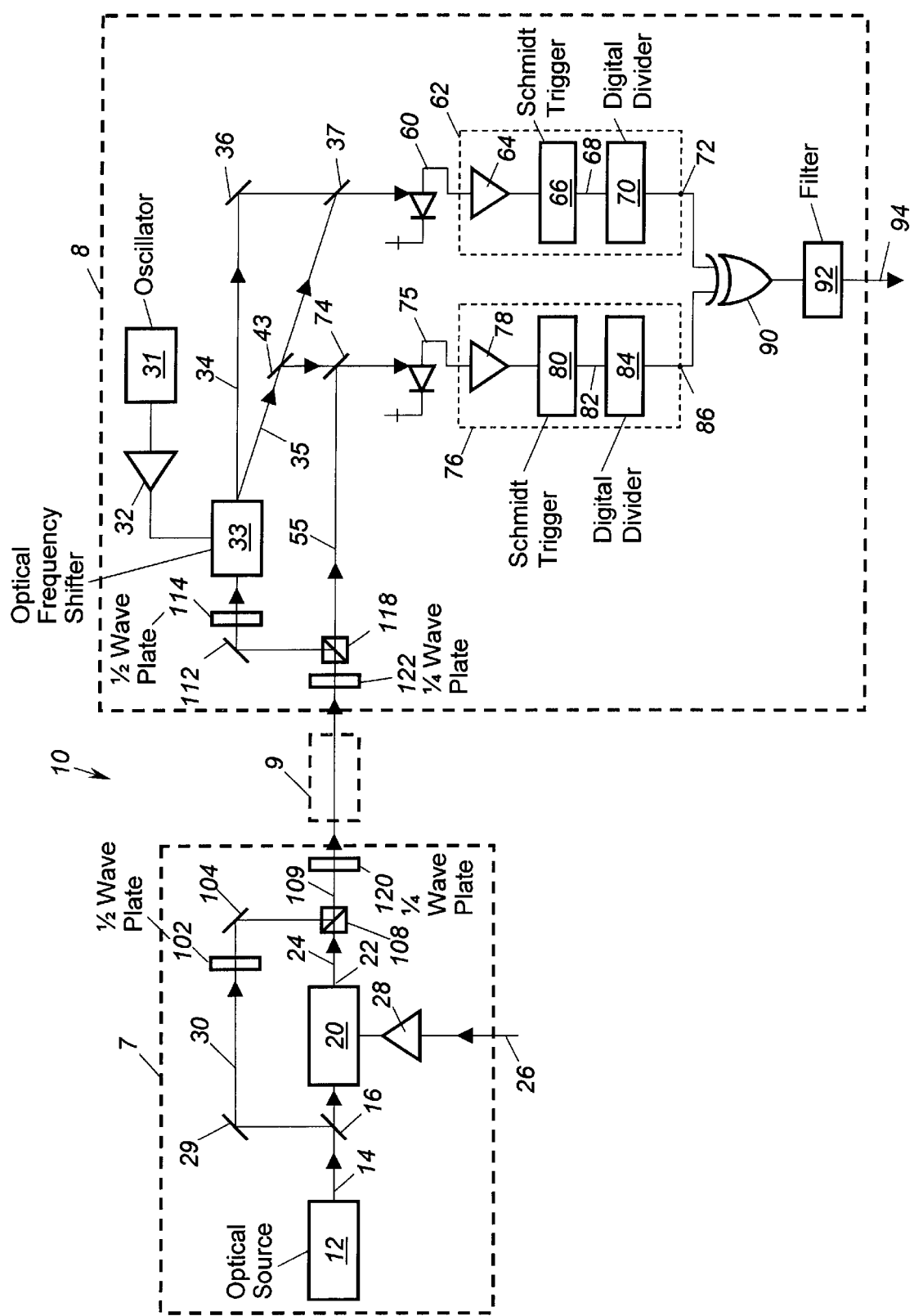
FIG. 5 is a schematic block diagram of an alternative embodiment of a portion of the optical communication system in accordance with the present invention.

Referring now to FIG. 5, an alternative embodiment of the optical communication system 10 is illustrated. Many of the elements of the system 10 are identical in construction to like elements of the system illustrated in FIG. 1 described above, and accordingly, there have been applied to each element of the system in FIG. 5 a reference numeral corresponding to the reference numeral that was applied to the like element of the system described above and shown in FIG. 1.

The fundamental difference between the system 10 of FIGS. 1 and 5 is that the transmitted beam of light propagating in link 9 has had its polarization modified by passing through a quarter wave plate. In addition, this embodiment shows the application of an acousto optic modulator as a frequency shifter and an optical interference means for obtaining the RF drive signal reference. More particularly, as shown in FIG. 5, an additional one-quarter wave plate 120, oriented at 45°, is positioned in the transmitter 7 in the path of the polarized phase modulated light beam 109. The one-quarter wave plate 120 causes the linear orthogonally polarized beam to become circularly polarized, either right handed circularly polarized or left handed circularly polarized. The phase modulated beam will also be rotated into some degree of circular polarization depending on the changing state of phase of this beam. This mostly circularly polarized light is transmitted through the analog optical link 9, which is preferably free space. In the receiver 8 the mostly circularly polarized light is passed through a one-quarter wave plate 122, oriented at 45°, so that two linear orthogonal polarized beams are generated. The first polarized beam corresponds to the reference beam and the second polarized beam corresponds to the phase modulated beam. The generated beams are applied to the polarization splitter cube 118, which serves to separate the beams as described previously. It should be recognized that the polarization of the reference beam is reflected by 45° mirror 112 and applied to the one-half wave plate 114 that is oriented at 45°. The half-wave plate 114 rotates the polarization 90° such that it has the same orientation as that of light beam 55. As was previously noted, it is possible to implement this circularly polarized embodiment all in optical fiber by using integrated optical wave plates tuned to a quarter-wave. The use of circularly polarized light typically allows the transmitter and receiver to have any rotational orientation relative to each other, a condition that commonly occurs in free space optical communication. However, in this invention this orientation will need to be maintained in a fixed state because the phase modulated beam will not generate a circularly polarized beam at all its changing states of phase.

In the receiver, the alternative embodiment in FIG. 5 shows an acousto optic modulator as the frequency shifter 33. This type of frequency shifter does not require a narrow band optical filter. The acousto-optic modulator 33 creates an acoustic sound wave that forms a traveling Bragg grating and generates two optical beams 34 and 35 from the modulated beam of light. The optical beam 34 is denoted as the reference beam and comprises the unshifted zeroth order beam of transmitted coherent light at frequency v that passes directly through the modulator and the optical beam 35 is a first order Bragg diffracted beam that is upshifted in optical frequency by the RF modulation frequency (e.g. v+2 GHz for the upper frequency limit of an acousto optic modulator) and is directed at the Bragg diffraction angle. Alternatively, both beams can be shifted. In any event, the beam 35 is separated from the beam 34.

The reference beam 34 is reflected off 45° mirror 36 to a beam combiner 37. Simultaneously, the upshifted light beam 35 is applied through beam splitter 43 to the beam combiner 37 where it interferometrically combines with the reference beam 34 and is applied to photodetector 60. The beam combiner 37 combines the light from the frequency upshifted and the frequency unshifted beams so that the optical interference between the beams performs a heterodyne of the two optical frequencies which generates the beat frequency representative of the RF drive signal generated by oscillator 31. Preferably, the optical path length of the two beams are equal. The beam splitter achieves this optical interference and performs the heterodyne by making the two beams co-linear and superimposed on each other, but techniques, including fiber optic combining techniques, also can be used.

It should be recognized that the degree of coherence provided by the particular source used dictates the optical path lengths and the particular beam recombination geometry. Thus sources at various wavelengths, optical paths of different lengths and different mirror geometries may be employed. It is important, however, that the light from the two beams be combined so that the optical interference that occurs between the two beams performs the heterodyne which generates the beat frequency corresponding to the RF drive signal frequency from oscillator 31.

In addition, the acousto-optic modulator 33 can generate other beams that can be used besides the unshifted beam and the upshifted beam shown in FIG. 5. In particular, it is possible to use a down-shifted beam (not shown) that can be generated by the acousto-optic modulator in place of the upshifted beam or to shift both beams.

The photodetector detector 60 responds to the intensity variations of the combined beams that are generated by optically heterodyning the two optical frequencies to create the reference RF beat frequency signal. This is applied to divide chain path 62 as shown in dashed lines. The photodetectors in this invention are preferably PIN photodiodes but other photodetectors such as avalanche photodiodes or photomultiplier tubes can be used.

In this way, the RF drive signal reference is generated using optical interference in this alternative embodiment instead of being provided by a direct connection as was done in the embodiment shown in FIG. 1. The RF drive signal reference generated from optical interference is used exactly as it was in the embodiment shown in FIG. 1 once it is applied to divide chain path 62. Beam splitter 43 provides a portion of the upshifted light 35 for use at beam combiner 74, in a similar manner to mirror 42 in the embodiment of FIG. 1. Accordingly, the present invention provides a linear voltage signal that represents the optical state of phase of the phase modulated communication light beam.

Obviously, many modifications and variations of the present invention are possible in view of the above teachings. Thus, it is to be understood that, within the scope of the appended claims, the invention may be practiced otherwise than as specifically described above.

What is claimed is:

1. An optical communication system using a radio frequency (RF) signal for communicating an analog communication signal comprising:
   an optical transmitter comprising:
   means for generating a reference light beam; and
   means responsive to the analog communication signal and said reference light beam and operative to produce a phase modulated communication light beam; and
   means responsive to said reference light beam and said phase modulated communication light beam and operative to produce a polarized communication light beam having phase modulation corresponding to the analog communication signal, and including the reference light beam; and
   an optical receiver comprising:
   first means for separating the reference light beam and the phase modulated communication light beam;
   second means responsive to said reference light beam and the RF signal and operative to develop a shifted light beam that is shifted in frequency relative to the frequency of said reference light beam by an amount corresponding to the RF;
   third means responsive to said phase modulated communication light beam and said shifted light beam and operative to interferometrically combine said communication light beam with said shifted light beam to provide a heterodyne signal including information regarding the state of phase of the communication light beam;
   fourth means responsive to said heterodyne signal and operative to produce an electrical signal at the optical beat frequency corresponding to the RF and with a phase corresponding to the state of phase of the communication light beam; and
   fifth means responsive to said RF signal and said electrical signal and operative to provide an output signal that has a linear correspondence to the state of optical phase of said communication light beam and the analog communication signal.

2. The optical communication system as set forth in claim 1, wherein said output signal has a magnitude that varies linearly relative to the state of optical phase of said communication light beam.

3. The optical communication system in claim 1, wherein said communication light beam is comprised of two orthogonally polarized beams.

4. The optical communication system in claim 3 and further comprising a quarter wave plate, wherein said communication light beam has had its polarization modified by passing though said quarter wave plate.

5. The optical communication system as set forth in claim 1, wherein said optical receiver comprises means for generating said RF signal.

6. The optical communication system as set forth in claim 1, wherein said means responsive to the analog signal comprises a straight phase modulator.

7. The optical communication system in claim 1, wherein said optical frequency shifting means shifts the frequency of said reference light beam.

8. The optical communication system in claim 1, wherein said optical frequency shifting means includes a Mach-Zehnder modulator and a narrow pass band optical filter.

9. The optical communication system in claim 1, wherein said optical frequency shifting means comprises an acousto-optic modulator.

10. The optical communication system as set forth in claim 1, wherein said fifth means includes sixth means for converting said RF signal into a first digital waveform, a first digital divider for dividing said first digital waveform by a predetermined integer to form a first square wave, seventh means for converting said electrical signal into a second digital waveform, a second digital divider for dividing said second digital waveform by said same predetermined integer to form a second square wave, eighth means includes an exclusive OR circuit for processing said first and said second divided square waves to form a pulse waveform, and ninth means for integrating said processed pulsed waveform to provide said output signal having a magnitude that varies linearly relative to the state of optical phase of said communication light beam and the analog communication signal.

11. The optical communication system as set forth in claim 10, and further comprising means for filtering said pulse waveform to produce said output signal.

12. The optical communication system as set forth in claim 1, wherein said fifth means includes an exclusive OR circuit for providing a pulse waveform having a duty cycle that reflects the relative phase between the divided RF signal and the divided heterodyned signal and an integrating circuit for developing said output signal.

13. The optical communication system as set forth in claim 1, wherein said output signal has an increasing magnitude over the change in the state of the optical phase equal to the product of $\pi$ radians of phase change and the divisor of the said digital dividers.

14. The optical communication system as set forth in claim 1, wherein said output signal magnitude varies linearly from a minimum to a maximum when the state of optical phase is changed by $\pi 2^m$ radians, where m is an integer.

15. The optical communication system as set forth in claim 1, wherein said output signal magnitude varies linearly from a minimum to a maximum when the state of optical phase is changed $\pi N$ radians, where N is an integer.

16. The optical communication system as set forth in claim 1, wherein said ninth means includes means for generating a pulse waveform having a duty cycle that reflects the relative optical phase state of the analog communication signal.

17. An optical receiver for receiving a polarized communication light beam having phase modulation corresponding to an analog communication signal comprising:

first means responsive to said polarized communication light beam and operative to develop a first phase modulated communication light beam and a second reference light beam that corresponds to said first light beam;

second means for generating a radio frequency (RF) signal;

third means responsive to said second reference light beam and said RF signal and operative to develop a shifted light beam that is shifted in frequency from the frequency of said second reference light beam by an amount corresponding to said RF;

fourth means responsive to said first phase modulated communication light beam and said shifted light beam and operative to interferometrically combine said communication light beam with said shifted light beam to provide a heterodyne is signal including information regarding the state of phase of the communication light beam;

fifth means responsive to said heterodyne signal and operative to produce an electrical signal at the optical beat frequency corresponding to the RF and with a phase corresponding to the state of phase of the communication light beam; and sixth means responsive to said RF signal and said electrical signal and operative to provide an output signal that has a linear correspondence to the state of optical phase of said communication light beam and the analog communication signal.

18. The optical receiver as set forth in claim 17, wherein said output signal has a magnitude that varies linearly relative to the state of optical phase of said communication light beam.

19. The optical receiver as set forth in claim 17, wherein said sixth means includes seventh means for converting said RF signal into a first digital waveform, a first digital divider for dividing said first digital waveform by a predetermined integer to form a first square wave, eighth means for converting said electrical signal into a second digital waveform, a second digital divider for dividing said second digital waveform by said same predetermined integer to form a second square wave, ninth means includes an exclusive OR circuit for processing said first and said second divided square waves to form a pulse waveform, and tenth means for integrating said processed pulse waveform to provide said output signal having a magnitude that varies linearly relative to the state of optical phase of said communication light beam and the analog communication signal.

20. The optical receiver as set forth in claim 17, wherein said output signal magnitude varies linearly from a minimum to a maximum when the state of optical phase is changed by $\pi 2^m$ radians, where m is an integer.

21. The optical receiver as set forth in claim 17, wherein said output signal magnitude varies linearly from a minimum to a maximum when the state of optical phase is changed $\pi N$ radians, where N is an integer.

22. The optical receiver as set forth in claim 17, wherein said sixth means includes a first digital divider and a second digital divider, said digital dividers serving to divide the first and second digital waveforms by N, where N=1,2,3,4, to form said first and second square waves and circuit means responsive to the divided said square waves and operative to produce said pulse waveform.

23. The optical receiver as set forth in claim 17, wherein said sixth means includes a first digital divider and a second digital divider, said digital dividers serving to divide the first and second digital waveforms by $2^m$, where m is any integer to form said first and second square waves, and circuit means responsive to the divided said square waves and operative to produce said pulse waveform.

24. The optical receiver as set forth in claim 17, wherein said circuit means includes an exclusive OR circuit for providing a pulse waveform having a duty cycle that reflects the relative phase between the divided RF signal and the divided electrical signal and an integrating circuit for developing said output signal.

25. The optical receiver as set forth in claim 24, wherein said output signal has a magnitude that varies linearly relative to the state of optical phase of said communication light beam.

26. The optical receiver as set forth in claim 24, wherein said output signal has an increasing magnitude over the change in the state of the optical phase equal to the product of $\pi$ radians of phase change and the divisor of the said digital dividers.

27. The optical receiver as set forth in claim 24, wherein said output signal magnitude varies linearly from a minimum to a maximum when the state of optical phase is changed by $\pi 2^m$ radians, where m is an integer.

28. The optical receiver as set forth in claim 24, wherein said output signal magnitude varies linearly from a minimum to a maximum when the state of optical phase is changed $\pi N$ radians, where N is an integer.

29. The optical receiver as set forth in claim 17, wherein said sixth means includes means for generating a pulse waveform having a duty cycle that reflects the relative optical phase state of the optical communication signal.

30. The optical receiver as set forth in claim 17, and further comprising means for filtering said pulse waveform to produce said output signal.

31. An optical receiver for receiving a polarized communication light beam having phase modulation corresponding to an analog communication signal comprising:

first means for generating a radio frequency (RF) signal;

second means responsive to said reference light beam and said RF signal and operative to produce a shifted light beam that is relatively shifted in frequency from the frequency of the reference light beam by said radio frequency (RF); and third means responsive to the reference light beam and the shifted light beam and operative to interferometrically combine the reference beam with said shifted light beam to provide a first heterodyne signal;

fourth means responsive to said first heterodyne signal and operative to produce a first electrical signal at the optical beat frequency corresponding to the RF;

fifth means responsive to said communication light beam and said shifted light beam and operative to interferometrically combine said communication light beam with said shifted light beam to provide a second heterodyne signal including information regarding the state of phase of the communication light beam;

sixth means responsive to said second heterodyne signal and operative to produce a second electrical signal at the optical beat frequency corresponding to the RF and with a phase corresponding to the state of phase of the communication light beam, and seventh means responsive to said first and said second electrical signals and operative to provide an output signal that has a linear correspondence to the state of optical phase of said communication light beam and the analog communication signal.

32. The optical receiver as set forth in claim 31, wherein said output signal has a magnitude that varies linearly relative to the state of optical phase of said communication light beam.

33. The optical receiver as set forth in claim 31, wherein said seventh means includes eighth means for converting said first electrical signal into a first digital waveform, a first digital divider for dividing said first digital waveform by a predetermined integer to form a first square wave, ninth means for converting said second electrical signal into a second digital waveform, a second digital divider for dividing said second digital waveform by said same predetermined integer to form a second square wave, tenth means including an exclusive OR circuit for processing said first and said second divided square waves to form a pulse waveform, and eleventh means for integrating said processed pulse waveform to provide said output signal having a magnitude that varies linearly relative to the state of optical phase of said communication light beam and the analog communication signal.

34. The optical receiver as set forth in claim 33, wherein said tenth means includes means for generating a pulse waveform having a duty cycle that reflects the relative optical phase state of the analog communication signal.

35. The optical receiver as set forth in claim 31, wherein said output signal magnitude varies linearly from a minimum to a maximum when the state of optical phase is changed by $\pi 2^m$ radians, where m is an integer.

36. The optical receiver as set forth in claim 31, wherein said output signal magnitude varies linearly from a minimum to a maximum when the state of optical phase is changed $\pi N$ radians, where N is an integer.

37. The optical receiver as set forth in claim 31, wherein said seventh means includes a first digital divider and a second digital divider, said digital dividers serving to divide the first and second digital waveforms signal by N, where N=1,2,3,4, to form said first and second square waves and circuit means responsive to the divided said square waves and operative to produce said pulse waveform.

38. The optical receiver as set forth in claim 37, and further comprising means for filtering said pulse waveform to produce said output signal.

39. The optical receiver as set forth in claim 37, and further comprising means for generating an RF signal.

40. The optical receiver as set forth in claim 31, wherein said seventh means includes a first digital divider and a second digital divider, said digital dividers serving to divide the first and second digital waveforms by $2^m$, where m is any integer to form said first and second square waves, and circuit means responsive to the divided said square waves and operative to produce said pulse waveform.

41. The optical receiver as set forth in claim 40, wherein said circuit means includes an exclusive OR circuit for providing a pulse waveform having a duty cycle that reflects the relative phase between the divided RF signal and the divided electrical signal and an integrating circuit for developing said output signal.

42. The optical receiver as set forth in claim 41, wherein said output signal has a magnitude that varies linearly relative to the state of optical phase of said communication light beam.

43. The optical receiver as set forth in claim 41, wherein said output signal has an increasing magnitude over the change in the state of the optical phase equal to the product of 7E radians of phase change and the divisor of the said digital dividers.

44. The optical receiver as set forth in claim 41, wherein said output signal magnitude varies linearly from a minimum to a maximum when the state of optical phase is changed by $\pi 2^m$ radians, where m is an integer.

45. The optical receiver as set forth in claim 41, wherein said output signal magnitude varies linearly from a minimum to a maximum when the state of optical phase is changed $\pi N$ radians, where N is an integer.

* * * * *